US00RE38160E

(19) United States
(12) Reissued Patent
Soergel

(10) Patent Number: US RE38,160 E
(45) Date of Reissued Patent: Jul. 1, 2003

(54) BALL CAP WITH TASSEL

(76) Inventor: Richard C. Soergel, 8825 Tommy Ct., San Diego, CA (US) 92119

(21) Appl. No.: 29/139,778

(22) Filed: Mar. 29, 2001

Related U.S. Patent Documents

Reissue of:
(64) Patent No.: Des. 435,330
Issued: Dec. 26, 2000
Appl. No.: 29/117,513
Filed: Jan. 21, 2000

(51) LOC (6) Cl. ..... 02-03
(52) U.S. Cl. ..... D2/866; D2/882
(58) Field of Search ..... D2/865, 866, 872, D2/873, 875, 876, 882, 884; 2/177, 181, 195.1, 244; D5/7; D6/581

(56) References Cited

U.S. PATENT DOCUMENTS

| | | | | | |
|---|---|---|---|---|---|
| D25,375 | S | * | 4/1896 | Beck | D2/865 |
| 1,043,152 | A | * | 11/1912 | Seely | 2/200.3 |
| D75,153 | S | * | 5/1928 | Davis | D2/869 |
| 1,775,185 | A | * | 9/1930 | Aldrich | 2/171.01 |
| D131,419 | S | * | 2/1942 | Hogg | D2/865 |
| D150,773 | S | * | 8/1948 | Johnson | D2/869 |
| 3,105,243 | A | * | 10/1963 | Kampfe et al. | 2/244 |
| 5,983,398 | A | * | 11/1999 | Kronenberger | 2/181 |
| 6,311,331 | B1 | * | 11/2001 | Park | 2/195.1 |

* cited by examiner

*Primary Examiner*—Paula A. Mortimer
(74) *Attorney, Agent, or Firm*—Knobbe, Martens, Olson & Bear, LLP

(57) CLAIM

The ornamental design for a ball cap with tassel [and removable button], as shown and described.

DESCRIPTION

FIG. 1 is a front isometric view of the ball cap with tassel of the present design;
FIG. 2 is a front view thereof;
FIG. 3 is a back view thereof;
FIG. 4 is a right-side view thereof;
FIG. 5 is a top view thereof;
FIG. 6 is a bottom view thereof; and,
FIG. 7 is a right-side view thereof, illustrating that a button can be removed from the cap.
*The broken lines disclose conventional stitching in all views. The hatching discloses fabric in all views.*

1 Claim, 7 Drawing Sheets

Figure 1:
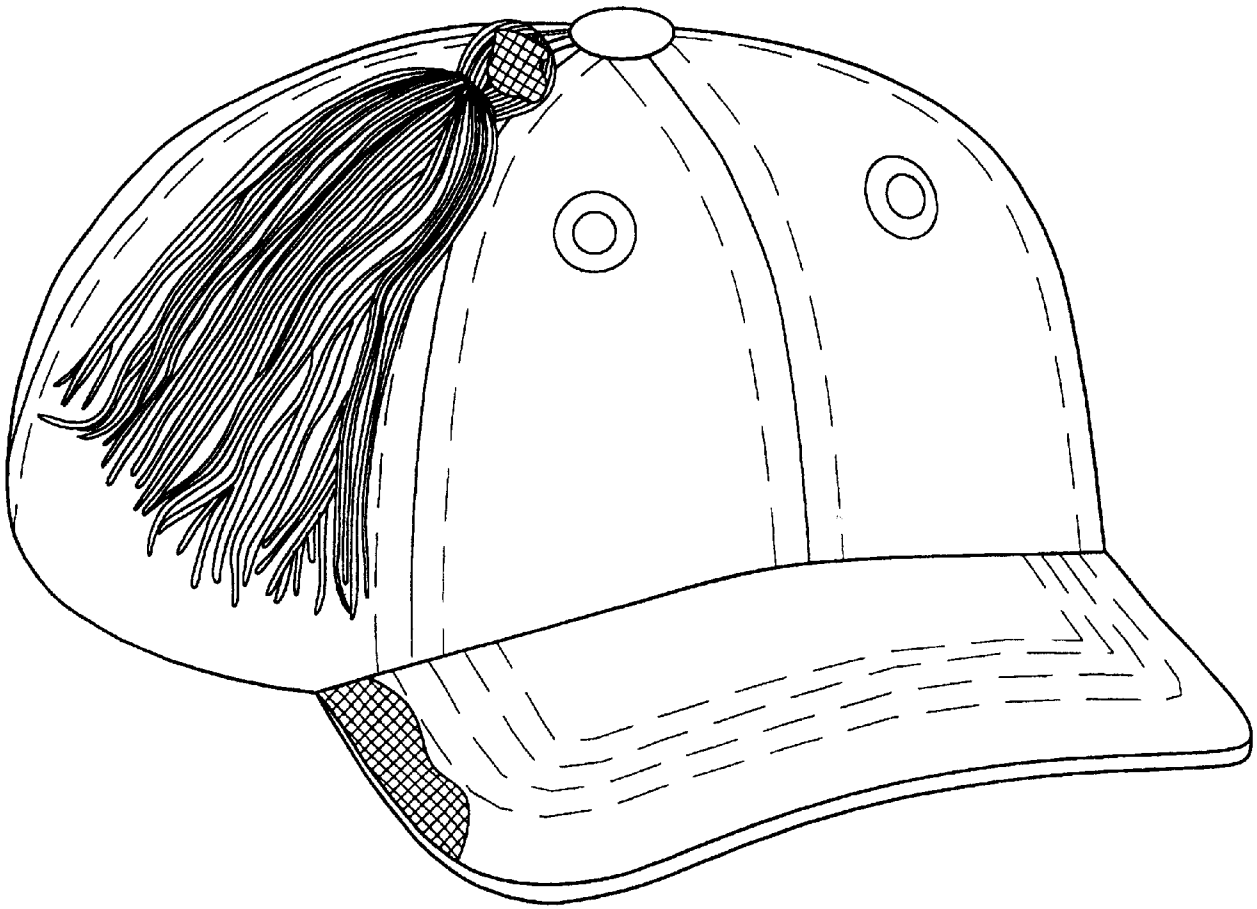
Figure 2:
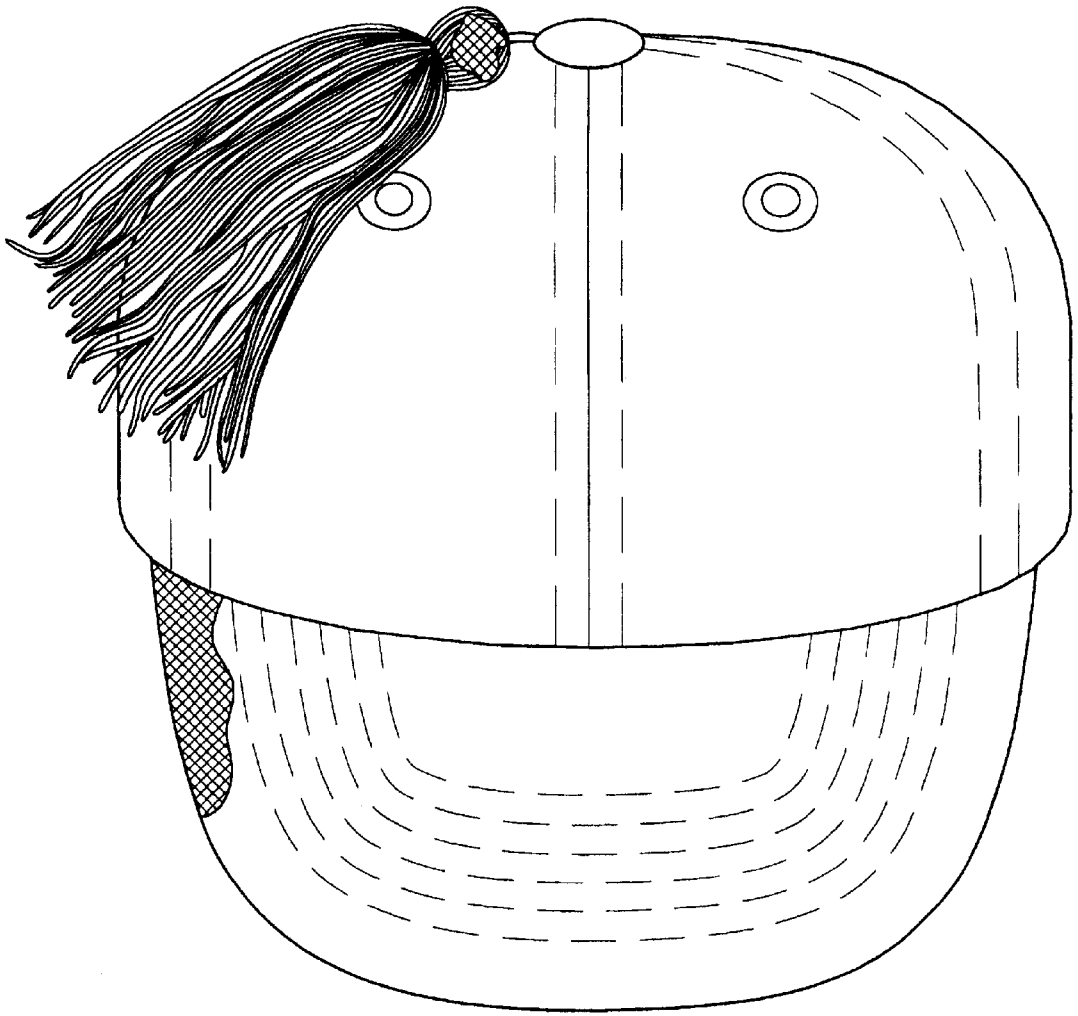
Figure 3:
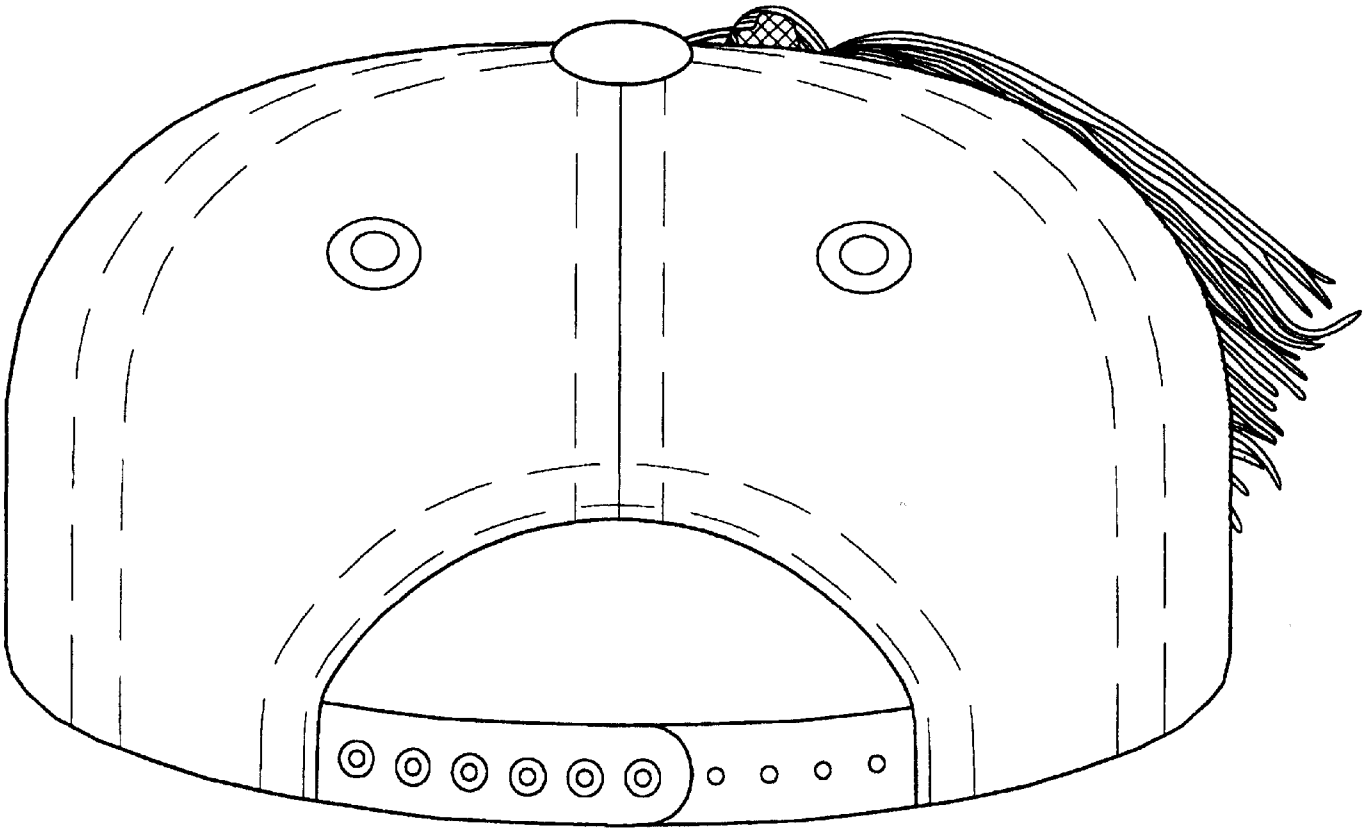
Figure 4:
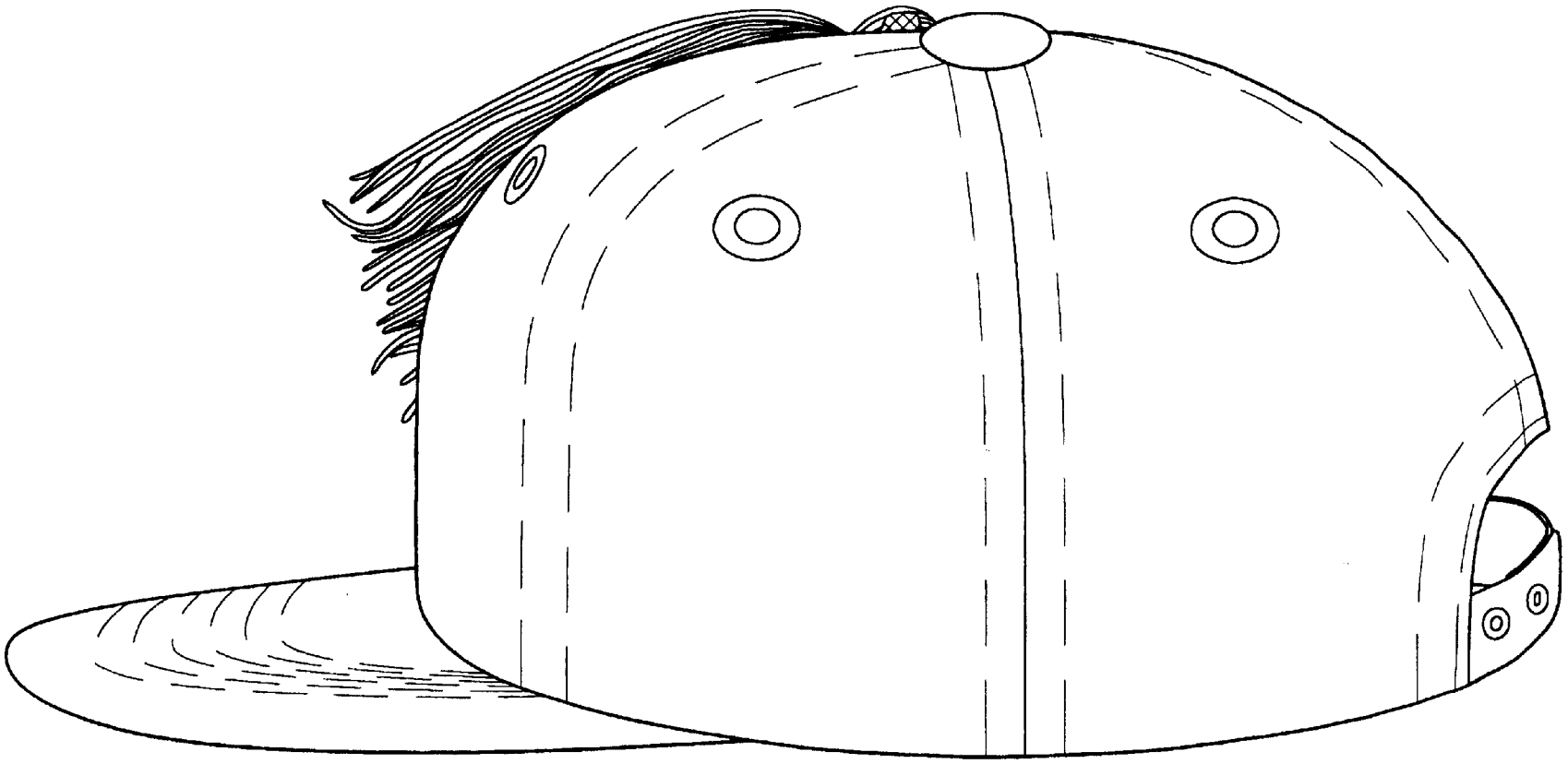
Figure 5:
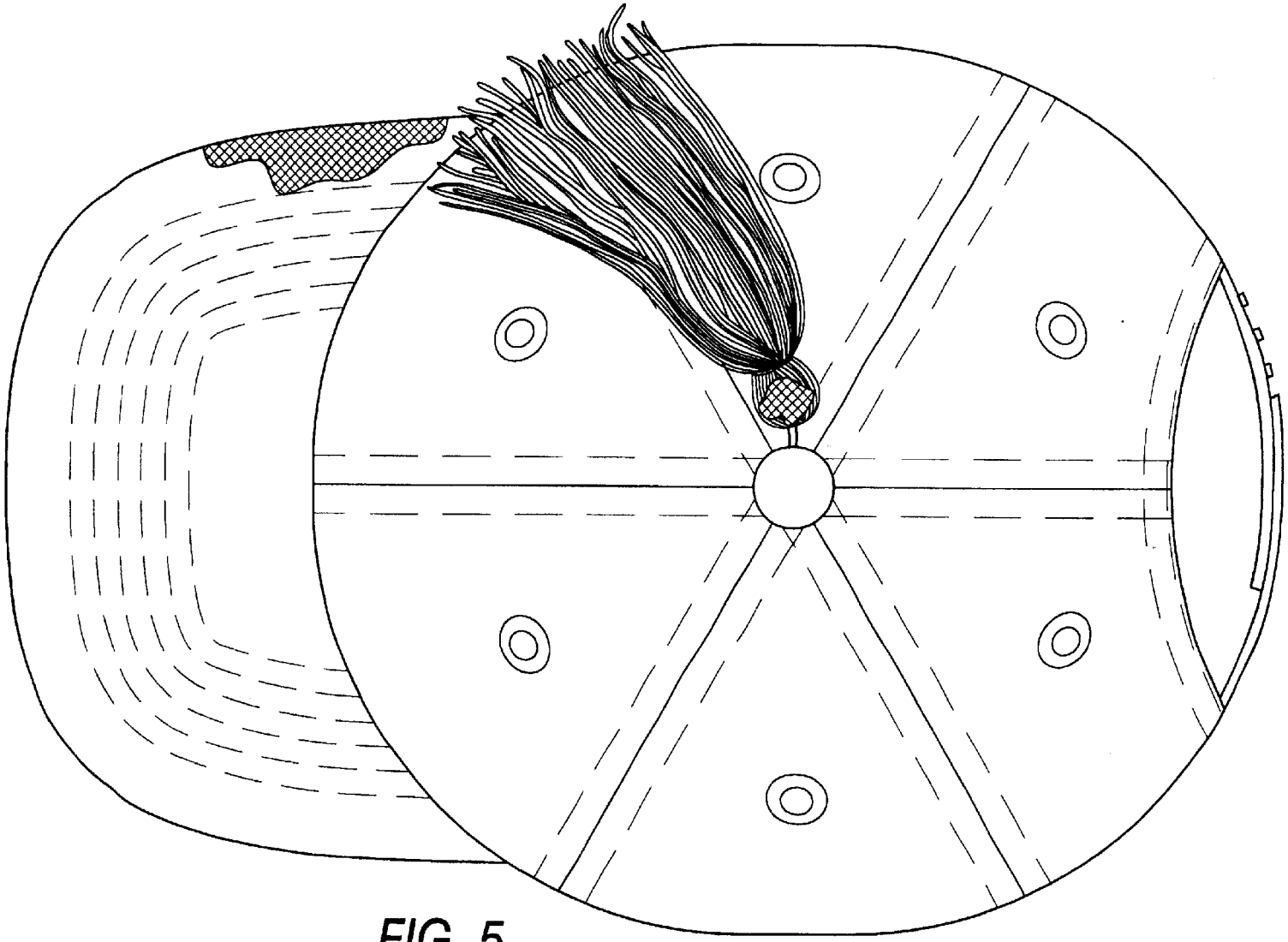
Figure 6:
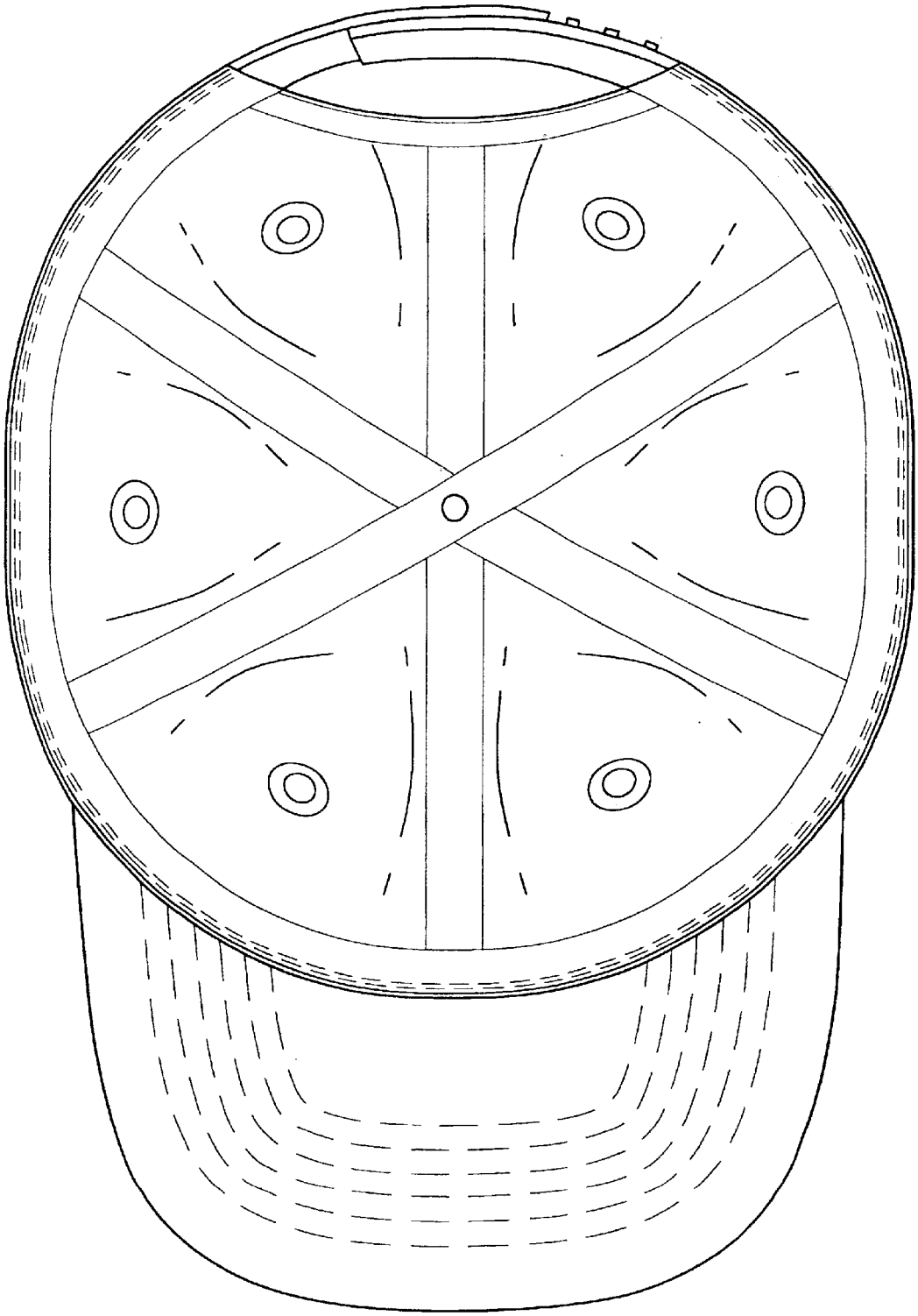
Figure 7:
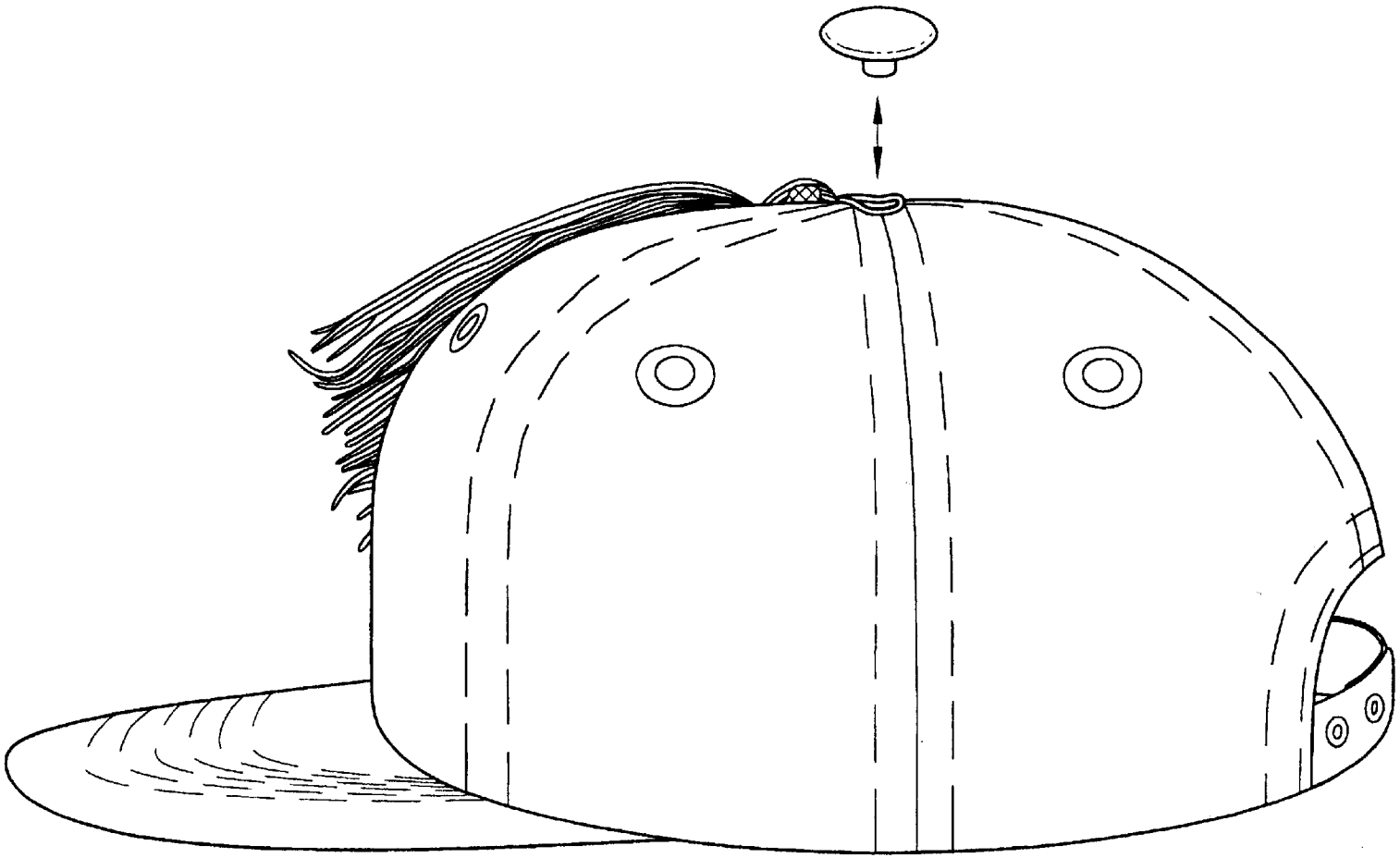

Matter enclosed in heavy brackets [ ] appears in the original patent, but forms no part of this reissue; matter printed in italics indicates the additiions made by reissue.